United States Patent [19]

Boehm

[11] Patent Number: 4,604,017
[45] Date of Patent: Aug. 5, 1986

[54] TREE TRANSPORTER

[76] Inventor: Terrence E. Boehm, Box 201, Allan, Saskatchewan, Canada, S0K 0C0

[21] Appl. No.: 745,073

[22] Filed: Jun. 17, 1985

[30] Foreign Application Priority Data

Jun. 25, 1984 [CA] Canada .................................. 457365

[51] Int. Cl.$^4$ ............................................... B60P 3/00
[52] U.S. Cl. .......................................... 414/23; 47/76; 211/13; 296/3; 414/572
[58] Field of Search ..................... 296/3; 414/23, 349, 414/469, 572; 144/334, 335, 336; 47/39, 42, 76, 86; 248/128, 130, 133, 137, 138, 139, 163.2, 396; 211/81, 13

[56] References Cited

U.S. PATENT DOCUMENTS

| | | | |
|---|---|---|---|
| 1,649,571 | 11/1927 | Clark | 248/137 X |
| 3,032,368 | 5/1962 | Sigler et al. | 414/23 X |
| 3,782,773 | 1/1974 | Mason | 296/3 |
| 4,351,253 | 9/1982 | Dahlquist | 296/3 X |

Primary Examiner—Robert J. Spar
Assistant Examiner—Janice Krizek
Attorney, Agent, or Firm—Stanley G. Ade; Adrian Battison

[57] ABSTRACT

A tree transporter comprises a plurality of buckets pivotally mounted on a rectangular frame. The frame has two sides and a central beam mounted higher than the sides together with a number of transverse beams so as to form square cells between the sides and the central beam in which the buckets can be received. The buckets are supported for pivotal movement on collars attached to the outer surface of the bucket with the axis of rotation inclined relative to the plane of an open mouth of the bucket so that the axis intersects the side wall of the bucket on one side higher than on the other side. In addition the axis of rotation is arranged diagonally relative to the square cells and inclined upwardly from one side to the higher central beam so that the bucket when it pivots moves from a position where the axis of the bucket points outwardly from the side for loading to a transport position wherein the axis of the bucket lies along the framework.

14 Claims, 4 Drawing Figures

TREE TRANSPORTER

BACKGROUND OF THE INVENTION

This invention relates to a tree transporter of the type comprising a number of buckets mounted pivotally on a framework with each bucket shaped to receive the root section of the tree. The framework is mounted on ground wheels for transportation.

Tree transporters of this type are known and examples are shown in U.S. Pat. Nos. 3,782,773, 3,778,098 and 3,032,368.

The buckets are generally conical with an open mouth at right angles to the cone for receiving the root section of the tree with the tree trunk extending along the axis out of the base of the cone. It is known and effectively essential that in the transport position the trees, that is the axis of the bucket, lie along the transporter frame longitudinally so that the trees do not project outwardly from the sides of the framework nor vertically upwardly. Thus the height and lateral extent of the trees during the transportation is reduced to the minimum to allow the transportation of the largest possible trees.

In the transport position it is not possible to load the trees into the buckets and therefore in the transporters of this type the bucket is generally pivotal about a horizontal axis so the bucket axis can be turned from the rearwardly directed angle to a vertically upward angle so the open mouth is horizontal to receive the tree root section from a lifting device. This position is however unsatisfactory for the loading of the tree into the bucket and therefore additional movement of the bucket has been necessary generally by removing the bucket from the framework. For example in U.S. Pat. No. 3,778,098 the bucket together with its pivot coupling is slidable along a ramp formed on the framework so that each bucket in turn is loaded from one end of the framework and moved toward the other end for transportation. This arrangement is unsatisfactory in that the buckets themselves must be manipulated by hand or by lifting mechanism and when the tree is in position in the bucket the whole is of a considerable weight and unwieldy bulk. Furthermore the trees can only be unloaded from the ramp type framework in turn and therefore if a tree at the top of the ramp is required it is necessary to unload all the lower trees before that one can be removed.

In U.S. Pat. No. 3,782,773 the problem is overcome by having the buckets removable from a support collar so the bucket can be lifted away from the collar and loaded and then returned to the collar for transportation.

It is one object of the invention therefore to provide a tree transporter of this type in which the buckets can be pivoted from a position in which the bucket is accessible for loading to a transport position in which the tree lies longitudinally of the framework.

According to a first aspect of the invention therefore, there is provided an apparatus for transporting trees comprising a framework having two spaced parallel sides, ground wheel on which the framework can be supported for transport, a plurality of buckets each having a planar open mouth, a peripheral wall and an axis at right angles to the plane of the mouth and each being shaped to receive the root section of a tree, and means mounting each bucket on the framework for pivotal movement about a pivot axis, the mounting means being arranged such that the pivot axis is inclined to the plane of the mouth and therefore passes through the peripheral wall of the bucket at two points one of which is spaced from the mouth by a greater distance than the other, such that the pivot axis is inclined to the horizontal whereby the end adjacent said one point is higher than the other end and such that the axis is inclined relative to the side whereby the bucket can be pivoted from a loading position wherein the bucket axis faces upwardly and outwardly from a side of the framework to a transport position in which the bucket axis faces upwardly and along the framework.

According to a second aspect of the invention there is provided an apparatus for transporting trees comprising a framework having a first longitudinal beam, a second longitudinal beam, means mounting the beams in parallel spaced relation with the second on a level higher than the first and a plurality of transverse beams spaced along the length of the first and second beams so as to form a plurality of rectangular framed cells, ground wheels on which the framework can be supported for transport, a plurality of buckets each having a planar open mouth and a peripheral wall arranged to provide an axis of the bucket which lies at right angles to the plane of the mouth and shaped to receive the root section of a tree, mounting means at opposed positions on the outer surface of the peripheral wall of each bucket for mounting the bucket on the framework and mounting receiving means on the framework for receiving the mounting means of the respective bucket, the mounting receiving means having a first portion on the first beam and a second portion on the second beam at the diagonally opposite position on the cell, the mounting means being arranged on the bucket such that the bucket is pivotal relative to the mounting receiving means about a pivot axis so that the pivot axis is inclined to the plane of the mouth and passes through the peripheral of the bucket at two points one of which is spaced from the mouth by a greater distance than the other, so that the axis is inclined to the horizontal whereby the end adjacent the second beam is higher than the other end and such that the axis is inclined relative to the first beam whereby the bucket can be pivoted from a loading position wherein the bucket axis faces outwardly from the first beam for receiving the tree root section to a transport position in which the bucket axis lies in a plane substantially parallel to the first and second beams.

It is one advantage of the invention, therefore, that the buckets while remaining fixed on the transporter framework can be pivoted from a first position in which the bucket axis is at right angles to the side of the framework and inclined upwardly relative to the side at an angle of the order of 45° to allow ready access to the bucket from a loading mechanism at the side of the framework. In this position therefore the loading mechanism can deposit the tree roots into the bucket with the trunk of the tree pointing directly out of the bucket.

The bucket can then be pivoted either manually or by a hydraulic or lever mechanism about the pivot axis to immediately and simply achieve the required transport position where the axis of the bucket that is the direction of the tree trunk lies in a vertical plane generally along the transporter with the tree inclined slightly upwardly so as to pass over a tree in a next adjacent bucket.

This movement can be achieved simply by a pivoting movement without any lifting of the bucket. Furthermore the bucket can be pivoted back to the loading position again simply without any lifting movement so that any one of the trees on the transporter can be unloaded by pivotal movement of that bucket while the other buckets remain in the transport position.

In accordance with a preferable arrangement, the central framework includes two parallel sides and a central beam parallel to the sides and raised relative thereto. The central beam therefore provides a direct support for the mounting means in the form of a stub shaft whereby the required inclination of the axis is achieved merely by resting the stub shafts on the beams providing the framework. In addition this arrangement provides two rows of tree supporting buckets each row arranged so that its loading position is adjacent the respective side. In this way the tree transporter can be loaded from two sides to provide two rows of the trees.

A latching mechanism can be provided to ensure that the bucket is maintained in the transport position despite any vibrational movement. Furthermore the bucket can rest against the beams forming the framework in both the loading and transport positions and can be balanced so that it is bi-stable, that is it falls overcentre to one or other of the positions as required.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
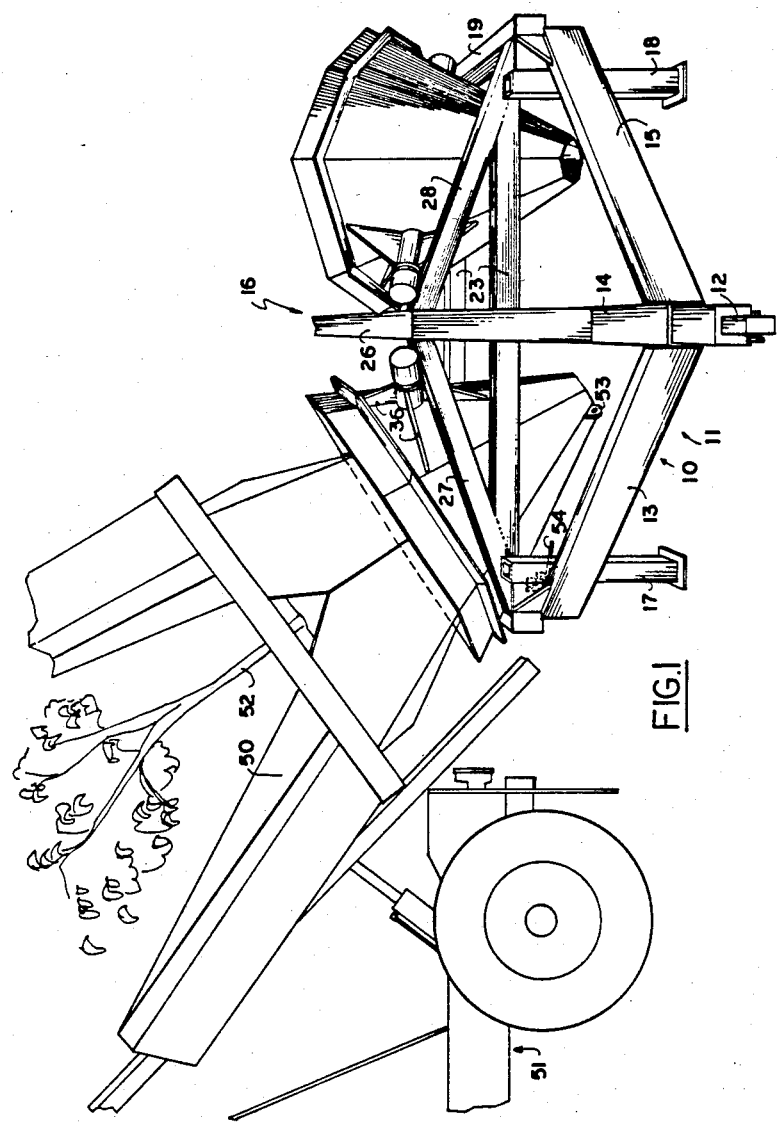
FIG. 1 is a perspective view from the front of a tree transporter according to the invention showing in side elevation a tree loader of conventional type.
Figure 2:
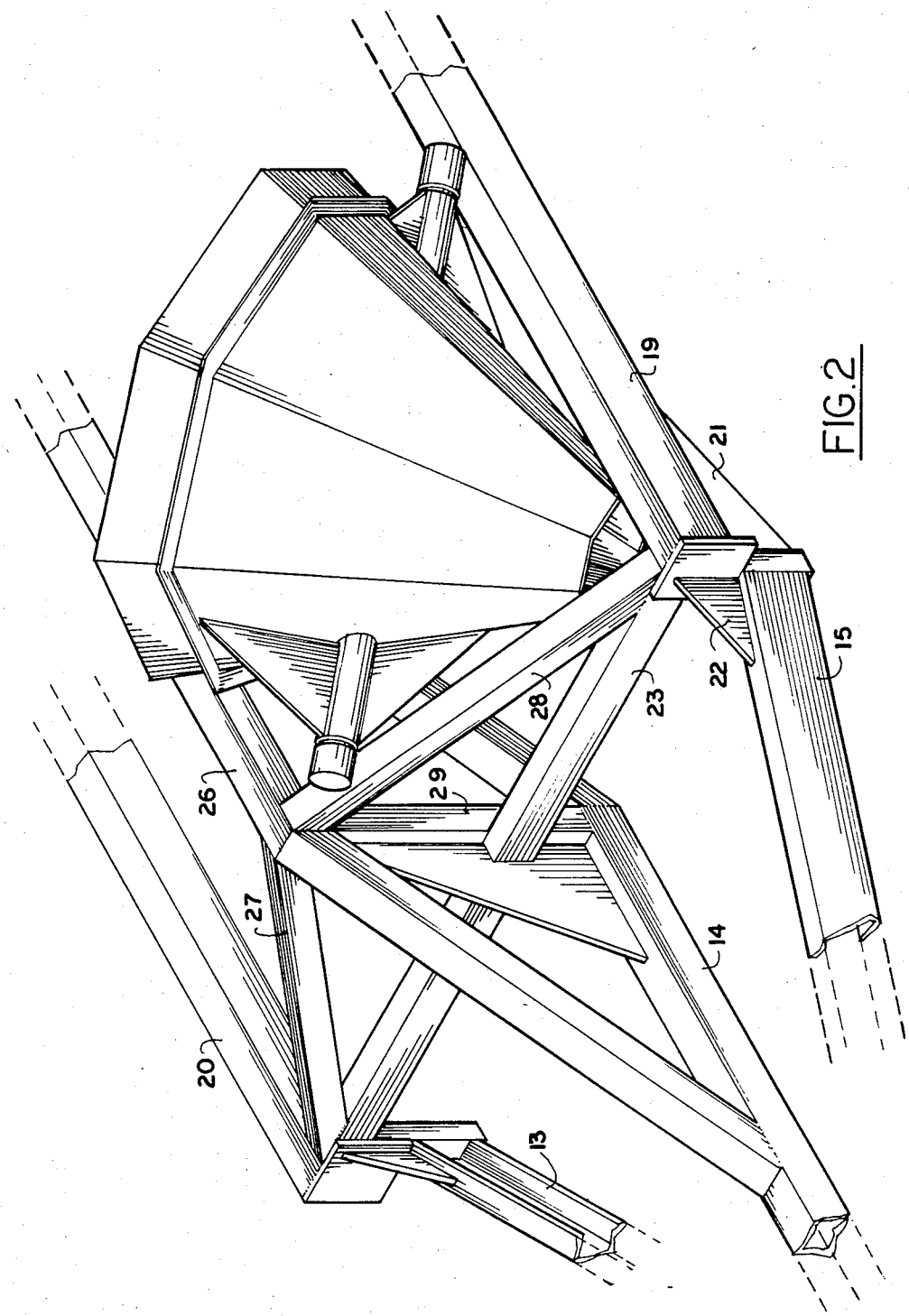
FIG. 2 is an isometric view from one corner showing part of the tree transporter of FIG. 1 and including only one of the buckets.

The tree transporter comprises a framework generally indicated at 10 and comprising a hitch section 11 including a hitch 12 and three hitch bars diverging from the hitch 12 and indicated at 13, 14 and 15 for connection to a main section 16 of the framework.

At the rear of the diverging hitch bars 13, 14, 15 is provided a pair of legs 17, 18 which can be raised and lowered by any suitable mechanism for supporting the framework when not in transport. The details of the legs are not of importance in relation to the present invention and therefore will not be described but the construction of suitable legs will be well apparent to one skilled in the art.

The main frame section 16 comprises a pair of spaced parallel side beams 19 and 20 coupled to the diverging hitch arms 13, 15 and extending rearwardly therefrom. To provide suitable coupling, gussets 21 and 22 are provided which ensure that the main frame section 16 can be drawn by the hitch section 11.

A plurality of transverse bars 23 spaced along the length of the main frame section 16 couple the side members 19 and 20 into a rigid rectangular framework. The framework is supported on a conventional ground wheel and axle assembly generally indicated at 24 which is of conventional construction and includes road springs 25 coupled to suitable portions of the framework as will be apparent to one skilled in the art.

The framework further includes a central beam 26 which is positioned midway between the two side beams 19 and 20 parallel thereto and raised relative thereto by a distance of the order of one-third of the spacing between the side beam and the central beam. The central beam 26 is coupled to the side beams 19 and 20 by inclined transverse beams 27, 28 lying in the same vertical plane as the transverse beams 23 together with a vertical beam 29. This forms a rigid support of the central beam 26 and also the transverse beams 27 and 28 are spaced relative to the central beam 26 and to the side beams 19 and 20 to provide square cells bounded on each side by a beam section for receiving the buckets.

Figure 4:
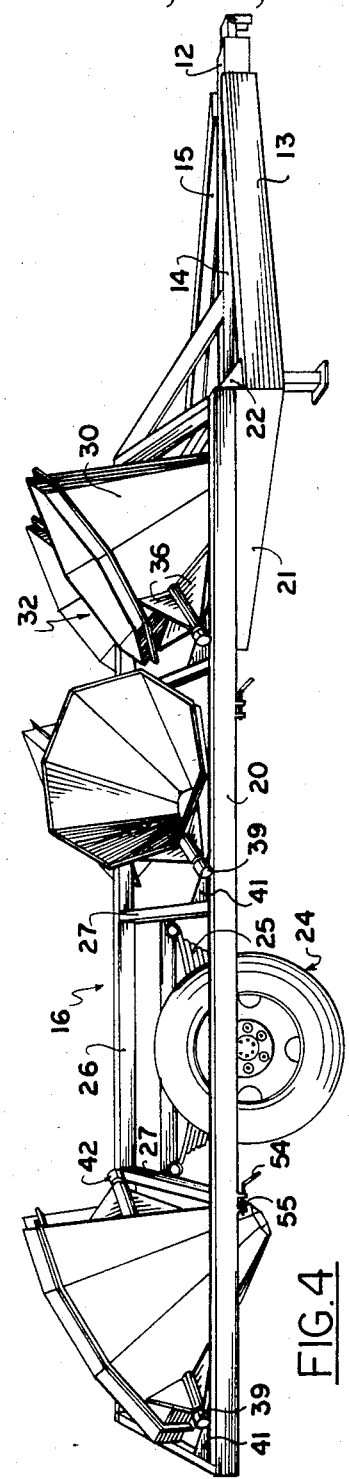
FIG. 4 is a perspective view from one side of the tree transporter of FIG. 1.

As shown particularly in FIG. 4, there are eight such square cells with buckets omitted from the cells adjacent the ground wheel 24 to accommodate the wheels.

Figure 3:
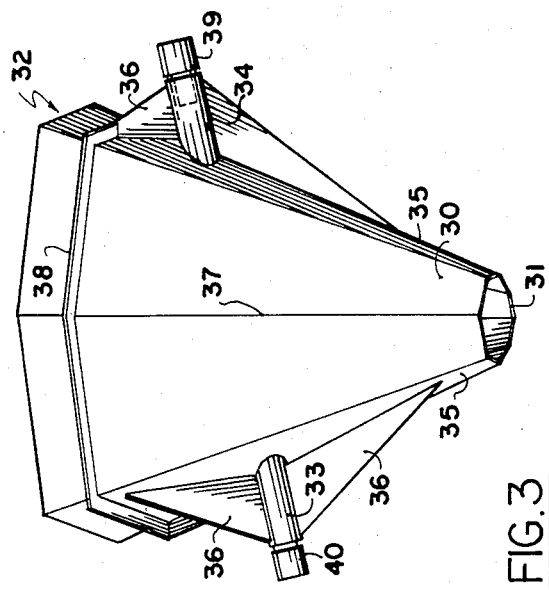
FIG. 3 is a side elevational view of a single bucket and mounting mechanism removed from the tree transporter of FIG. 1.

Each bucket is of the construction shown in FIG. 3 and comprises basically a conical peripheral wall formed in eight flat sections converging to a flat base. The wall sections are indicated at 30 and the flat base at 31. An open mouth 32 is defined at the end opposite the base 31 and lies in a plane at right angles to the axis of the cone so the bucket can receive the root section of a tree with the bottom of the roots contacting the base 31 and the upper portions of the tree projecting out of the open mouth 32.

The bucket shown is manufactured conveniently from the eight flat pieces but it will be apparent that it can be manufactured in any alternative form to provide a peripheral wall which can support the tree roots and an open mouth for receiving the tree roots.

A pivot mounting for the bucket comprises a pair of collars 33, 34 arranged co-axially and extending outwardly from the outer surface of the peripheral wall at diametrically opposed locations on the peripheral wall. Thus the collars are mounted or attached to the peripheral wall at seams between the flat panels 30 indicated at 35. The collars are supported relative to the outside surface of the two adjacent flat panels 30 by four gussets 36 which extend outwardly from the collar across the face of the adjacent panel 30.

As shown particularly in FIG. 3 the collar 34 is positioned closer to the mouth 32 than is the collar 33 and thus the axis of the collars is inclined relative to the mouth and relative to the axis indicated at 37 of the bucket itself. This inclination is of the order of 10° and is sufficient to space the collar 33 from the edge of the mouth by a distance of the order of 1.5 times the spacing between the mouth and the collar 34.

A supporting flange 38 is arranged around the outer peripheral wall of the bucket adjacent the open mouth to provide support and rigidity to the bucket and it will be noted that the gussets 36 of the collar 33 do not reach the flange 38 whereas the gussets 36 of the collar 34 intersect the flange 38.

The collars rotatably receive a pair of stub shafts 39, 40 whereby the bucket can be pivoted about the axis of the collars 33, 34 on the stub shafts 39, 40. The buckets are mounted on the framework by attachment suitably by welding of the stub shafts 39 and 40 at diametrically opposite corners of the respective framework cell. Thus the stub shaft 39 is welded to a triangular plate 41 attached across the corner between a beam 27 and the side 19, 20. Similarly the stub shaft 40 is welded to a traingular plate 42 positioned diametrically opposite the plate 41 and welded to the junction between a beam 27 and the central beam 26.

Thus it will be appreciated that the axis about which the bucket pivots has three characteristics. Firstly it is inclined relative to a line at right angles to the axis of the bucket by an angle of the order of 12° and preferably in the range 8° to 20°. Secondly it is inclined relative to the horizontal by being mounted on the central beam and thus is inclined relative to the horizontal by an angle of the order of 8° and preferably lying in the range 5° to 25°. Furthermore the axis is inclined in the horizontal plane relative to the side 19, 20 at an angle of the order of 45°. These inclinations of the bucket and its pivot axis together cause a pivotal movement of the bucket from a transport position to a loading position. In FIG. 1 the right hand bucket is shown in the transport position and the left hand bucket is shown in the loading position. In FIG. 4 the middle bucket on the near side is shown in the loading position with the outer bucket shown in the transport position. Thus in the loading position the axis of the bucket is turned outwardly approximately at right angles to the side and inclined upwardly at an angle of the order of 45°. Thus the bucket is immediately convenient to receive a tree from a loader as shown in FIG. 1. The loader is generally indicated at 50 mounted on a tractor 51 and including a tree 52.

When it is loaded, the bucket can be turned to the transport position in which the axis of the bucket lies in a vertical plane parallel to the sides of the framework and inclined upwardly at an angle again of the order of 45°. Thus the trees incline rearwardly of the transporter and do not hang out of the sides and do not project directly upwardly thus reducing the width and height of the trailer comprising the transporter.

A latch pin 54 can be received in a lug 55 mounted on the side member 19, 10 adjacent each of the buckets. The latch pin cooperates with a lug 53 provided on each of the buckets to latch the bucket in the transport position. In addition a notch (not shown) is cut in the side wall of the bucket for cooperation with the beam 27 adjacent the bucket in the transport position so that the bucket can tip completely to the transport position. Thus the bucket is held rigid in the transport position by the latch pin and the notch.

The center of gravity of the bucket is arranged to be slightly higher than the axis of the collars 33, 34 so that it tilts over center from the transport position to the loading position and vice versa and hence is bistable and sits in either position. The bucket can then be transferred from one position to the other either by pushing manually or by a lever system or by a hydraulic system depending upon the size of the buckets and the intended weight of the trees to be transported.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for transporting trees comprising a framework having two spaced parallel sides, ground wheels on which the framework can be supported for transport, a plurality of buckets each having a planar open mouth, a peripheral wall and an axis at right angles to the plane of the mouth and each being shaped to receive the root section of a tree, and means mounting each bucket on the framework for pivotal movement about a pivot axis, the mounting means being arranged such that the pivot axis is inclined to the plane of the mouth and therefore passes through the peripheral wall of the bucket at two points one of which is spaced from the mouth by a greater distance than the other, such that the pivot axis is inclined to the horizontal whereby the end of the bucket adjacent said one point is higher than the other end and such that the axis is inclined relative to the side of the framework whereby the bucket can be pivoted from a loading position wherein the bucket axis faces upwardly and outwardly from the side of the framework to a transport position in which the bucket axis faces upwardly/and along the framework.

2. The invention according to claim 1 wherein the mounting means is arranged so that the bucket axis in the loading position extends outwardly from the side substantially at right angles thereto.

3. The invention according to claim 1 wherein in the transport position the bucket axis lies in a vertical plane which is parallel to a vertical plane including the side.

4. The invention according to claim 1 wherein the mounting means is arranged such that the pivot axis is arranged at an angle of the order or 45° to the side.

5. The invention according to claim 1 wherein the framework has a plurality of support beams forming a plurality of rectangular cells each for receiving a bucket, one side of each cell being formed by the side of the framework wherein the mounting means is arranged at diagonally opposite corners of each cell whereby the pivot axis of each bucket lies diagonal to the cell.

6. The invention according to claim 1 wherein the framework includes a central beam parallel to the sides and wherein the central beam is supported in a position higher than the sides, the mounting means including means mounted on said central beam so as to support the pivot axis higher at the central beam than at the side.

7. The invention according to claim 1 wherein the mounting means includes a pair of collars attached to the peripheral wall of the bucket and a pair of stub shafts mounted on the framework on which the collars are rotatable.

8. The invention according to claim 1 including latch means for releasably latching each bucket in the transport position.

9. The invention according to claim 1 wherein the bucket rests against the framework in the transport and loading positions.

10. Apparatus for transporting trees comprising a framework having a first longitudinal beam, a second longitudinal beam, means mounting the beams in parallel spaced relation with the second on a level higher than the first and a plurality of transverse beams spaced along the length of the first and second beams so as to form a plurality of rectangular framed cells, ground wheels on which the framework can be supported for transport, a plurality of buckets each having a planar open mouth and a peripheral wall arranged to provide an axis of the bucket which lies at right angles to the plane of the mouth and shaped to receive the root section of a tree, mounting means at opposed positions on the outer surface of the peripheral wall of each bucket for mounting the bucket on the framework and mounting receiving means on the framework for receiving the mounting means of the respective bucket, the mounting receiving means having a first portion on the first beam and a second portion on the second beam at the diagonally opposite position on the cell, the mounting means being arranged on the bucket such that the bucket is pivotal relative to the mounting receiving means about a pivot axis so that the pivot axis is inclined to the plane of the mouth and passes through the peripheral wall of the bucket at two points one of which is spaced from the mouth by a greater distance than the other, so that the axis is inclined to the horizontal whereby the end of the bucket adjacent the second beam is higher than the other end and such that the axis is inclined relative to the first beam whereby the bucket can be pivoted from a loading position wherein the bucket axis faces outwardly from the first beam for receiving the tree root section to a transport position in which the bucket axis lies in a plane substantially parallel to the first and second beams.

11. The invention according to claim 10 wherein the mounting means is arranged so that the bucket axis in the loading position extends outwardly from the side substantially at right angles thereto.

12. The invention according to claim 10 wherein the mounting means includes a pair of collars attached to the peripheral wall of the bucket and a pair of stub shafts mounted on the framework on which the collars are rotatable.

13. The invention according to claim 10 including latch means for releasably latching each bucket in the transport position.

14. The invention according to claim 10 or 13 wherein the bucket rests against the framework in the transport and loading positions.

* * * * *